US012172678B2

(12) United States Patent
Hahn et al.

(10) Patent No.: US 12,172,678 B2
(45) Date of Patent: Dec. 24, 2024

(54) DETECTION SYSTEM FOR PREDICTING INFORMATION ON PEDESTRIAN

(71) Applicant: Aptiv Technologies AG, Schaffhausen (CH)

(72) Inventors: Lukas Hahn, Wuppertal (DE); Maximilian Schaefer, Wuppertal (DE); Kun Zhao, Düsseldorf (DE); Frederik Lenard Hasecke, Solingen (DE); Yvonne Schnickmann, Wuppertal (DE); Andre Paus, Wuppertal (DE)

(73) Assignee: Aptiv Technologies AG, Schaffhausen (CH)

( * ) Notice: Subject to any disclaimer, the term of this patent is extended or adjusted under 35 U.S.C. 154(b) by 403 days.

(21) Appl. No.: 17/649,672

(22) Filed: Feb. 1, 2022

(65) Prior Publication Data

US 2022/0242453 A1 Aug. 4, 2022

(30) Foreign Application Priority Data

Feb. 2, 2021 (EP) .................................... 21154871

(51) Int. Cl.
*B60W 60/00* (2020.01)
*B60W 50/00* (2006.01)
(Continued)

(52) U.S. Cl.
CPC .... *B60W 60/0027* (2020.02); *B60W 50/0097* (2013.01); *G06N 3/08* (2013.01); *B60W 2554/4029* (2020.02)

(58) Field of Classification Search
CPC ......... B60W 60/0027; B60W 50/0097; B60W 2554/4029; B60W 2556/35; G06N 3/08;
(Continued)

(56) References Cited

U.S. PATENT DOCUMENTS 9,760,806 B1 * 9/2017 Ning ...................... G06V 20/56
10,235,882 B1 * 3/2019 Aoude ............. G08G 1/096725
(Continued)

FOREIGN PATENT DOCUMENTS

| CN | 109063559 A | * | 12/2018 | ......... G06K 9/00362 |
| CN | 110068343 A | * | 7/2019 | ........... G05D 1/0088 |
| CN | 110378281 A | * | 10/2019 | |

OTHER PUBLICATIONS

"Extended European Search Report", EP Application No. 21154871. 4, Jul. 14, 2021, 12 pages.
(Continued)

*Primary Examiner* — Asghar H Bilgrami
(74) *Attorney, Agent, or Firm* — Harness, Dickey & Pierce, P.L.C.

(57) ABSTRACT

The prediction system for predicting an information related to a pedestrian has a tracking module that detects and tracks in real-time a pedestrian in an operating area, from sensor data; a machine-learning prediction module that performs a prediction of information at future times related to the tracked pedestrian using a machine-learning algorithm from input data including data of the tracked pedestrian transmitted by the tracking module and map data of the operating area; a pedestrian behavior assessment module that determines additional data of the tracked pedestrian representative of a real time behavior of the pedestrian, and said additional data of the tracked pedestrian is used by the machine-learning prediction module as another input data to perform the prediction.

19 Claims, 2 Drawing Sheets

(51) Int. Cl.

| | |
|---|---|
| *G01C 21/16* | (2006.01) |
| *G01C 21/34* | (2006.01) |
| *G01S 13/58* | (2006.01) |
| *G01S 13/86* | (2006.01) |
| *G01S 19/49* | (2010.01) |
| *G06N 3/08* | (2023.01) |
| *G06N 20/00* | (2019.01) |
| *G06V 20/58* | (2022.01) |
| *G08G 1/16* | (2006.01) |

(58) Field of Classification Search
CPC ........ G06N 3/044; G06N 3/045; G06N 20/00; G06V 20/58; G08G 1/166; G01C 21/3492; G01C 21/1652; G01C 21/3415; G01S 13/58; G01S 13/867; G01S 13/931; G01S 19/49
See application file for complete search history.

(56) References Cited

U.S. PATENT DOCUMENTS

| | | | |
|---|---|---|---|
| 11,893,496 B2* | 2/2024 | Nguyen | G06N 20/00 |
| 2015/0206001 A1* | 7/2015 | Maurer | G06F 18/24 |
| | | | 382/103 |
| 2017/0270374 A1* | 9/2017 | Myers | G06V 40/103 |
| 2018/0143644 A1* | 5/2018 | Li | G06V 40/107 |
| 2019/0236958 A1* | 8/2019 | Fang | G08G 1/16 |
| 2020/0272148 A1* | 8/2020 | Karasev | G06N 20/10 |
| 2020/0283016 A1* | 9/2020 | Blaiotta | B60W 60/0011 |
| 2021/0009163 A1* | 1/2021 | Urtasun | G08G 1/20 |

OTHER PUBLICATIONS

Becker, et al., "An RNN-Based IMM Filter Surrogate", 2019, pp. 387-398.

Wyk, et al., "A Projection-Based Joint Probabilistic Data Association Algorithm", 2004, pp. 313-317.

* cited by examiner

DETECTION SYSTEM FOR PREDICTING INFORMATION ON PEDESTRIAN

CROSS-REFERENCE OF RELATED APPLICATIONS

This application claims priority to European Patent Application Number 21154871.4, filed Feb. 2, 2021, the disclosure of which is hereby incorporated by reference in its entirety herein.

BACKGROUND

The present disclosure relates to a system and a method of predicting information related to a pedestrian, typically for autonomous driving. An autonomous or self-driving vehicle driving in an urban environment is highly likely to operate near vulnerable road users like pedestrians and cyclists. In order to rule out collision with a vulnerable road user, the autonomous vehicle can significantly reduce its velocity close to the vulnerable road user. However, the driver of a human driven vehicle, present in the surroundings, may be surprised by such a behavior of the autonomous vehicle, and cause an accident between the two vehicles. Actually, on roads taken by a mix of autonomous vehicles and human driven vehicles, such a velocity reduction is a problem as it is likely to increase the number of accidents.

When driving a motor vehicle, a human driver considers in real time a multi-actor scene including multiple traffic actors (vehicle, pedestrian, bicycle, or any other potentially moving object) in an operating area surrounding the vehicle and takes maneuver decisions based on a current environment and a short-term prediction of how the traffic actors may behave. In particular, the human driver can generally predict the trajectory of a pedestrian based on an observation of the behavior of the pedestrian and act depending on his prediction of the pedestrian's trajectory. The human driver significantly reduces its velocity close to a pedestrian only when the driver anticipates that the pedestrian may have a dangerous behavior in a short-term period, which is actually a rare situation.

There is a need to improve the situation. More precisely, there is a need to predict more accurately information related to a pedestrian.

SUMMARY

The present disclosure concerns a system for prediction of information related to a pedestrian having a tracking module that detects and tracks in real-time a pedestrian located in an operating area, from sensor data; a machine-learning prediction module that performs a prediction of information at future times related to the tracked pedestrian using a machine-learning algorithm from input data including data of the tracked pedestrian transmitted by the tracking module and map data of the operating area; characterized in that the system further includes a pedestrian behavior assessment module that determines additional data of the tracked pedestrian representative of a real time behavior of the pedestrian, and said additional data of the tracked pedestrian is used by the machine-learning prediction module as another input data to perform the prediction.

The present prediction system takes into account how the pedestrian behaves in order to predict more accurately what the pedestrian intends to do. The system is able to predict intent and behavior of the pedestrians in many situations to allow for typical urban velocities in low distances to the pedestrians.

Advantageously, the prediction system further includes a prediction fusion module that performs a fusion of a prediction of information related to the tracked pedestrian based on information determined by the tracking module and the prediction of information related to the tracked pedestrian performed by the machine-learning prediction module.

The fusion of the two kinds of prediction allows to improve the accuracy and robustness of the final prediction.

The predicted information related to the tracked pedestrian can include at least one of a pedestrian trajectory at future times and an information on a pedestrian intention at future times.

Thus, the prediction can be reflected in two modes: in a first mode, the abstract intention of the pedestrian is predicted (e.g., stays on boardwalk, intends to cross a road, waits for vehicle to pass, etc.), and in a second mode, a concrete trajectory of the pedestrian is predicted.

The machine-learning prediction module has a deep neural network. For example, the deep neural network is a convolutional neural network.

Optionally, the pedestrian behavior assessment module includes a key point detection block that detects body key points of the pedestrian from pedestrian data.

The body key points of a pedestrian are an important feature to gain knowledge about the pedestrian's pose or behavior. They can be detected using data related to bounding boxes representing the detected pedestrian, provided by the tracking module.

The behavior assessment module comprises at least one of an action recognition block that identifies a class of action of the tracked pedestrian, and a traffic awareness detection block that identifies a class of awareness state of the tracked pedestrian with respect to a traffic situation around said pedestrian.

For example, the behavior assessment module detects that the pedestrian is looking at his smartphone and is consequently very distracted and not aware of the traffic situation. In another example, the behavior assessment module detects that the pedestrian has eye contact with the self-driving vehicle and is consequently aware that the self-driving vehicle is approaching.

In a particular embodiment, the behavior assessment module is an encoder of an encoder-decoder neural network. In that case, the behavior assessment module and the machine-learning prediction module can be trained jointly.

The prediction system advantageously includes a map processing module that receives high-definition map data, receives real time data of a position of a vehicle, said position of the vehicle defining the operating area, extracts, from the high definition map data, map data relevant for prediction of information on pedestrians and within the operating area, to obtain simplified map data of the operating area, and transmits the simplified map data of the operating area to the machine-learning prediction module.

Advantageously, the tracking module includes: an object detection block that receives sensor data from different sensor domains and detects objects independently in the different sensor domains, a fusion and tracking block that performs a fusion of the independent object detections from the different sensor domains and tracks each fused object detection.

The tracking module can use Kalman filtering.

The tracking module can also use a projection-based joint probabilistic data association (PJPDA) filter.

In some embodiments, the tracking module transmits a flow of data packets related to the tracked pedestrian to the pedestrian behavior assessment module, each data packet including identification data of the tracked pedestrian; bounding box data of at least one bounding box, each bounding box corresponding to the detection of the tracked pedestrian.

The present disclosure further concerns a vehicle integrating the prediction system previously defined and at least one sensor.

The present disclosure also concerns a computer-implemented method for predicting information related to a pedestrian, including the following steps carried out by computer hardware components: at a tracking module, detecting and tracking in real-time a pedestrian located in an operating area, from sensor data; at a machine-learning prediction module, performing a prediction of information at future times related to the tracked pedestrian using a machine-learning algorithm from input data including data of the tracked pedestrian provided by the step of detecting and tracking and map data of the operating area; characterized in that the method further includes a step of determining additional data of the tracked pedestrian representative of a real time behavior of the pedestrian, at a pedestrian behavior assessment module, and said additional data of the tracked pedestrian is used by the machine-learning algorithm as another input data to perform the prediction.

The present disclosure also concerns a computer program including instructions which, when the program is executed by a computer, cause the computer to carry out the above defined method.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure concerns a prediction system, or an architecture, 100 for predicting information related to a pedestrian. Such a prediction system 100 can be installed in a vehicle 200, such as a self-driving (in other words: autonomous) vehicle, to detect one or more pedestrians in the surroundings of the vehicle 200 and predict (evaluate) accurately what the pedestrian may do in a short-term future. The predicted information is for example a predicted trajectory of the pedestrian or a predicted intention of the pedestrian (i.e., what the pedestrian intends to do). The prediction can concern a short-term future period of time of a few seconds from the present time (e.g., between 1 and 5 seconds, typically 2 or 3 seconds). However, a longer prediction may be possible.

Figure 1:
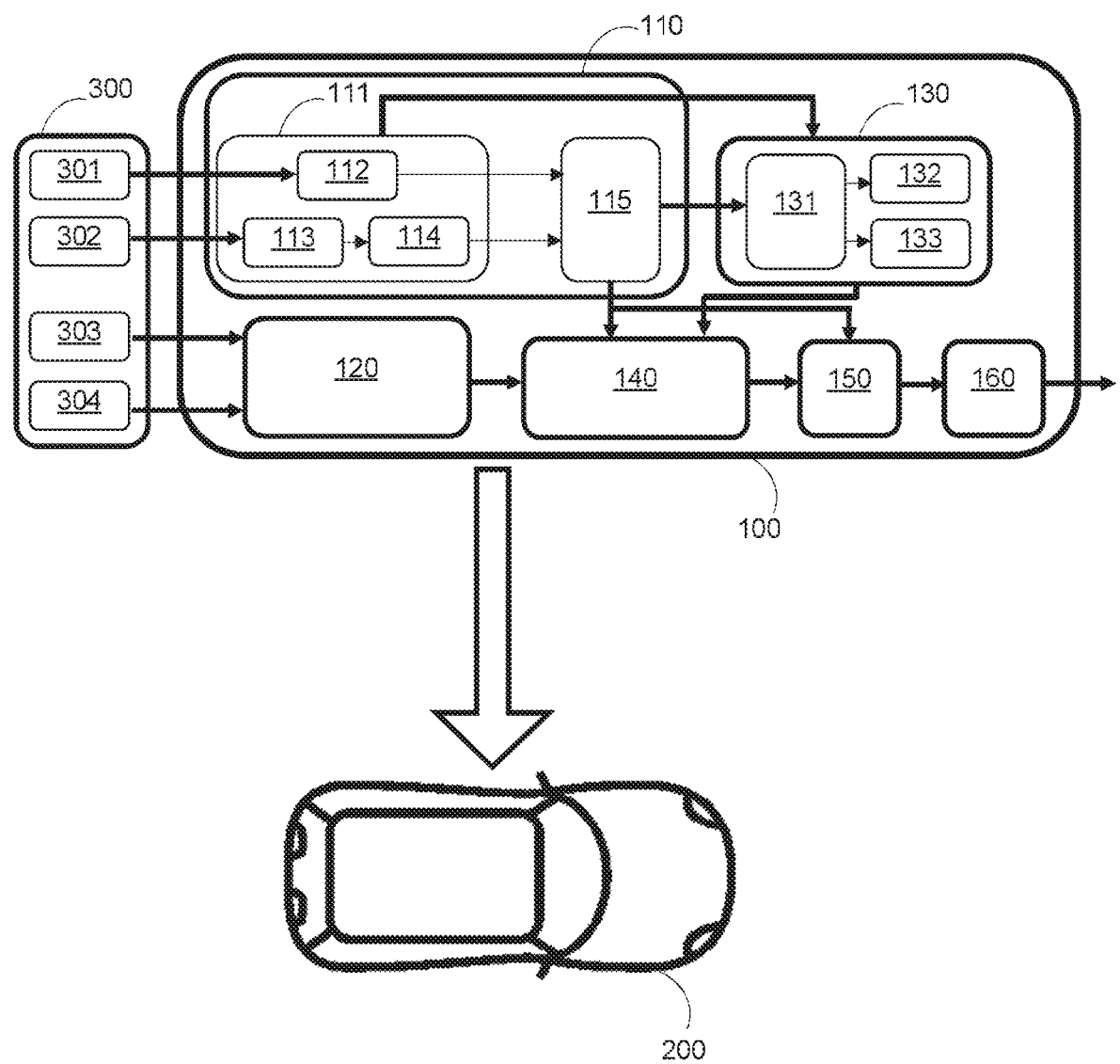
FIG. 1 shows a system for prediction of information related to a pedestrian, according to a first embodiment.

FIG. 1 shows a particular and illustrative first embodiment of the prediction system 100 installed in the vehicle 200.

In FIG. 1, the reference 300 represents a set of data inputs 301 to 304 into the prediction system 100 coming from different sources that can be inside or outside the vehicle 200, as described below.

The system 100 has access to real-time data streams coming from one or more sensors such as camera(s), LIDAR(s) or radar(s), installed aboard the vehicle 200. For example, as shown in FIG. 1, the sensor data inputs can include: a camera data input is an example of one of the sensor data inputs 301, for instance, representing real-time data stream(s) coming from one or more cameras installed in the vehicle 200, for example from one front facing camera, such as a red-blue-green (RBG) spectrum camera, and sensor data inputs 302 configured as a LIDAR data input representing real-time data stream(s) coming from one or more LIDARs installed in the vehicle 200, for example from one 360° rotating LIDAR sensor mounted on the vehicle roof.

The system 100 has also access to a real-time automotive navigation data stream 303 coming from an automotive navigation system, typically a GPS ('Global Positioning System') receiver of the vehicle 200 that provides real time geolocation (in other words: position) and time information of the vehicle 200. For an improved location accuracy, a differential GPS and/or an inertial measurement unit (IMU) might be used for correction of the GPS data.

The system 100 has also access to map data 304. The map data can be stored in a memory of the vehicle 200 and/or be accessible on a distant server through a communication network. It can be high-definition (HD) map data. The HD map is a detailed map of a region where the vehicle 200 operates or is expected to operate. The HD map is provided in a specific file format, for example an openDRIVE® format.

The system 100 has different functional modules or blocks. In the first embodiment (FIG. 1), the system 100 has the following functional modules: a tracking module 110; a map processing module 120; a pedestrian behavior assessment module 130; a machine-learning prediction module 140; a prediction fusion module 150; and an output module 160.

The tracking module 110 has the function of detecting and tracking in real-time traffic actors (also called objects) located in an operating area, from sensor data coming from the sensor data inputs 301, 302.

A traffic actor can be a pedestrian, a bicycle, a car, a truck, a bus, or any potentially moving object.

An operating area is defined as an area surrounding the vehicle 200, within a range R around the vehicle 200. For example, the range R is a value between 50 m and 100 m.

The tracking module 110 can have two functional blocks: an object detection block 111 and a fusion and tracking block 115.

The object detection block 111 performs real-time object detection. It receives sensor data from different sensors of the vehicle 200 (here: camera data in the sensor data inputs 301, LIDAR data in the sensor data inputs 302) in different sensor domains (here: the camera domain and the LIDAR domain) and detects objects (traffic actors) independently in the different sensor domains, in real time. In the image domain, the object detection block 111 uses an object detection block 112, for example, like YOLO®, to detect objects in image data (in other words: camera data). In the LIDAR domain, the object detection block 111 has a clustering software component 113, that performs a cluster analysis of LIDAR points to group a set of LIDAR points considered as similar, and a classification software component 114, that classifies the object detections into object classes. The object detection block 111 can make multiple object detections, independently, of the same object captured in different sensor domains and/or by different sensors. The term "independently" means that, for a same object (or group of objects, as explained later), there are multiple detections of the object (or group of objects) respectively in different sensor domains or by different sensors. In the present example, the object detection block 111 makes two object detections for the same detected object, like a pedestrian: a first object detection in the image (camera) domain and a second object detection in the LIDAR domain. Each object detection is transmitted independently to the fusion and tracking block 115 via an independent flow of information.

The fusion and tracking block 115 fuses the different object detections of the same detected object made in the different sensor domains (here, in the image domain and in the LIDAR domain) and tracks each detected object (for example a pedestrian). One unique identifier ID is assigned to each detected object. The fusion and tracking block 115 tracks each detected object independently. The fusion and tracking block 115 can also track a group of objects which are close to each other (e.g., the distance between objects of the same group is less than a predetermined distance threshold) and share a similar movement. In that case, the block 115 can update state vectors of individual objects in the group jointly.

The fusion and tracking block 115 can also predict information related to a detected object at future times, typically a trajectory of the detected object in next time frames, from the tracking information. For example, the block 115 determines a predicted trajectory of the detected object by extrapolation of its past trajectory and based on dynamic model(s), as known by the person skilled in the art. The dynamic models are used to predict the future states of a pedestrian. The state of a pedestrian consists of a state vector with different features related to the pedestrian such as position, velocity, acceleration, box size (height, width, length), and a corresponding covariance matrix. To cope with the high maneuverability of a pedestrian, different dynamic models (e.g., constant velocity and constant acceleration model) can be used.

The fusion and tracking block 115 can use Kalman filter(s). Optionally, the fusion and tracking block 115 can use a JPDA (joint probabilistic data association) filter, such as a PJPDA (Projection-based Joint probabilistic Data Association) filter, which is a more specific implementation of a Kalman filter. Detections can be assigned to tracks by applying Projection-based Joint Probabilistic Data Association (PJPDA). It allows to consider all tracks jointly in the association of detections to tracks, like the JPDA filter (JPDAF), while also running in real time for a high number of pedestrians or tracks.

The map processing module 120 has access to the high-definition (HD) map data 304 describing the vehicle's surroundings. The map processing module 120 has also access to real time position data 303 of the vehicle 200. The module 120 prepares the data to be usable as input for the machine-learning module 140. For example, it produces a rasterized image representation using predefined value ranges. A function of the map processing module 120 is to generate simplified map information of an operating area of the vehicle 200 (surrounding the vehicle 200), describing for example the following illustrative and non-exhaustive list of static road elements: boardwalk layout; road layout; road lanes layout; zebra crossing areas; traffic lights; traffic islands; and lane markings.

The pedestrian behavior assessment module 130 determines additional data of the tracked pedestrian representative of a real time behavior of the pedestrian. The additional data of the pedestrian is different from the pedestrian data determined by the tracking module.

In the first embodiment, the pedestrian behavior assessment module 130 has a key point detection block 131, an action recognition block 132 and a traffic awareness detection block 133.

The key point detection block 131 detects body key points of a tracked pedestrian from data output by the tracking module 110. The body key points can be selected in the illustrative and non-exhaustive list including the following body elements: nose, left eye, right eye, left ear, right ear, left shoulder, right shoulder, left elbow, right elbow, left wrist, right wrist, left hip, right hip, left knee, right knee, left ankle, right ankle. The key point detection block 131 can use a neural network, for example an encoder-decoder convolutional neural network (CNN). During a training phase of the key point detection block 131, training data can include: as input data: cropped camera image of a pedestrian at time t, for a plurality of pedestrians and a plurality of times t; (optional) cropped Lidar depth and/or intensity information of said pedestrian at time t; (only during training) single body key point heatmaps (one for every key point to learn), as labels; as output data: single body key point heatmaps (one for every key point).

The action recognition block 132 has the function of identifying an action class of a tracked pedestrian. The action class can be selected in the illustrative and non-exhaustive list including standing, walking, running, and lying. The action recognition block 132 can use a neural network, such as a recurrent neural network (RNN) or a long short-term memory (LSTM). During a training phase of the action recognition block 132, training data can include: as input data: a series of consecutive sets of body key points from t-Δt to time t per pedestrian (from block 131); (optional) a series of consecutive cropped images from t-Δt to time t of said pedestrian; (during training only) a label describing the action of the sequence such as "walking", "standing", "running", "crossing"; as output data: class attribute describing the action of the sequence, such as "walking," "standing," "running," "crossing."

The traffic awareness detection block 133 has the function of identifying a class of awareness state of the tracked pedestrian with respect to a traffic situation around the pedestrian. The awareness state class defines a level an awareness of the pedestrian with respect to the traffic around the pedestrian. For example, the awareness state class can be selected in the non-exhaustive list including eye contact with the vehicle 200, peripheral sight, unaware, distracted. The traffic awareness detection block 133 can use a neural network, for example a convolutional neural network (CNN). During a training phase of the traffic awareness detection block 133, training data can include: as input data: cropped camera image of a pedestrian at time t, for a plurality of pedestrians and a plurality of times t; a set of body key points for said pedestrian (from block 131) at time t; (only during training) an integer value indicating one of a plurality of awareness state classes like "fully aware", "partially aware", "unaware" and "distracted"; as output data: an integer value indicating one of said awareness state classes.

The two blocks 132, 133 receive the data output from the key point detection block 131, as input data. In addition, the blocks 131, 132 and 133 can receive and use the output of the object detection block 112 and/or from the components 113 and 114, as additional information.

As previously indicated, the pedestrian behavior assessment module 130 can use one or more neural networks to perform the tasks of detecting body key points, recognizing an action of the pedestrian, and identifying a state of awareness of the pedestrian.

The machine-learning prediction module 140 has the function of performing a prediction of information at future times related to a tracked pedestrian. It takes, as input data, tracking data of the tracked pedestrian transmitted by the fusion and tracking block 115 and map data of the operating area of the vehicle 200 transmitted by the map processing module 120. The prediction uses a machine-learning algorithm to perform the prediction. The machine-learning prediction module 140 can use a neural network, for example a convolutional neural network (CNN) or a recurrent neural network (RNN). During a training phase of the machine-learning prediction module 140, the training data can include: as input data: a series of consecutive states of a target pedestrian from t-Δt to time t (current time step), indicating information on the state of the target pedestrian (e.g. position, velocity, acceleration, orientation); a series of rasterized high-definition maps from t-Δt to time t describing the static context of the target pedestrian and additional features related to this static context (e.g. distance to a curb); a series of classification results from the blocks 132 and 133 for the target pedestrian from t-Δt to time t; optionally, a latent representation from the blocks 132 and 133 for the target pedestrian; a series of consecutive states of other traffic actors (e. g. vehicles and other pedestrians) in the proximity of the target pedestrian from t-Δt to time t; as output data: a future trajectory of the target pedestrian for n future time steps consisting for example of a series of mean vectors (positions) and corresponding covariance matrices; road crossing probabilities of the target pedestrian for n future time steps.

In the first embodiment, the two modules 130, 140 are separated modules. The neural network of the pedestrian behavior assessment module 130 and the neural network of the machine-learning prediction module 140 are trained separately and independently.

The predicted information related to the tracked pedestrian can include a pedestrian trajectory at future times and/or an information on a pedestrian intention at future times. Typically, the "future times" can represent a few seconds following a current time. For example, the "future times" can be within a period of time starting from a current time and lasting between 1 and 10 seconds, preferably between 1 and 5 seconds, for example 2 or 3 seconds. However, the period of time of prediction can be longer. For example, the pedestrian intention can be to stay on boardwalk, to cross the road, to wait for the vehicle 200 to pass, or any other predictable pedestrian intention.

The prediction fusion module 150 has the function of performing a fusion of a first prediction of information related to the tracked pedestrian performed by the machine-learning module 140 and a second prediction of information related to the tracked pedestrian based on information determined by the tracking module 110.

The output module 160 formats the predicted information related to the tracked pedestrian in accordance with requirements of the vehicle system.

Figure 2:
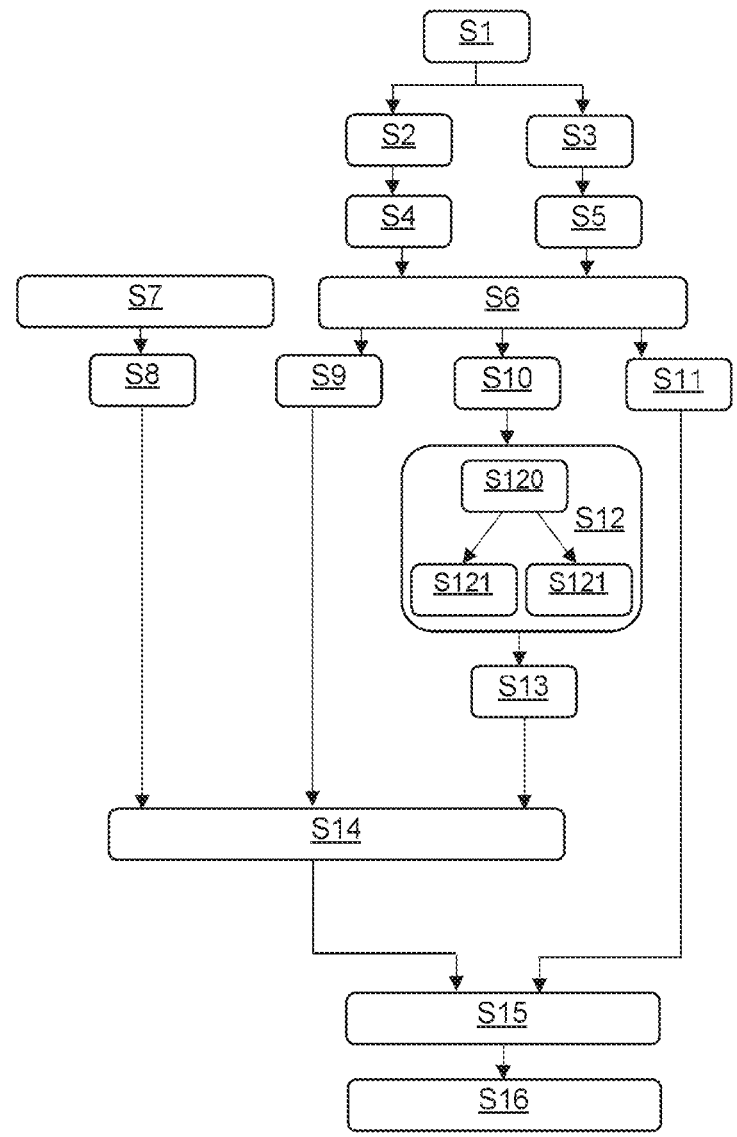
FIG. 2 represents a flowchart of a method for predicting information related to a pedestrian, according to a first embodiment.

A method of predicting information related to a pedestrian, corresponding to the operation of the prediction system 100 is illustrated in FIG. 2 and is now be described.

In a first step S1, the object detection block 111 receives a first real time flow of camera data in the sensor data inputs 301, here from the front camera of the vehicle 200, and a second real time flow of LIDAR data in the sensor data inputs 302, here from the 360° rotating LIDAR installed on the roof of the vehicle 200. Relevant objects (pedestrians, cars, trucks, bicycles, etc.) are detected independently in the camera domain (in other words, image domain), by the block 112, and in the LIDAR domain, by the components 113 and 114, within the operating area of the vehicle 200.

It is assumed that a pedestrian is in the operating area of the vehicle 200. Therefore, the pedestrian is detected independently in the camera domain, in a step S2, and in the LIDAR domain, in a step S3.

Each object detection in the camera domain includes the following elements: coordinates of a 2D bounding box (rectangle) in the coordinate system of the camera; an object class identifier (e.g., a predefined integer such as 1 for a car, 2 for a pedestrian, etc.); a classification confidence value (between 0 and 1) representing a confidence score for the bounding box to contain an object of the identified specific object class;
a frame index (positive integer) representing time.

Each object detection in the LIDAR domain includes the following elements: coordinates of a 3D bounding box (rectangle parallelepiped) in the vehicle coordinate system; an object class identifier (e.g., a predefined integer such as 1 for a car, 2 for a pedestrian, etc.); a classification confidence value (between 0 and 1) representing a confidence score for the box to contain an object of the identified specific object class;
a frame index (positive integer) representing time.

For each independent object detection, the object detection block 111 transmits an independent flow of information to the fusion and tracking block 115. In the camera domain, for each camera-detected object (for example, a pedestrian), the flow of information transmitted in a step S4 includes a camera identifier and the 2D bounding box coordinates in the camera coordinate system. In the LIDAR domain, the flow of information transmitted in a step S5 includes a LIDAR identifier and the 3D bounding box coordinates in the vehicle coordinate system.

In a step S6, the fusion and tracking block 115 performs a fusion of the independent object detections from different sensor domains (here in the camera domain and in the LIDAR domain). Any technique of fusion of sensor data can be used. For example, the sensor data fusion uses one or more Kalman filter(s). Each object detection is assigned to a track and each detected object is tracked in real time. A unique identifier is assigned to each tracked object. In the block 115, the sensor fusion is done using for example an extended Kalman filter. Detections of a pedestrian in the sensor data is assigned to a corresponding track. Assigned detections from the different sensors are separately used to update the current state of a pedestrian or track. This allows to use of the advantages of each sensor and handle missing detections from single sensors. The detections from the different sensors are separately assigned to the corresponding track.

In addition, the fusion and tracking block 115 performs a first prediction to predict a trajectory of the tracked object in future times, typically in a short-term future of a few seconds after the present time. The first prediction is based on tracking data of the object, typically by extrapolation of the past trajectory of the object and using dynamic model(s). The first prediction can be performed by the Kalman filter(s). It can also use an interacting multiple model estimator.

In parallel to the object detection and tracking, the map processing module 120 generates simplified map data of the operating area of the vehicle 200, in a step S7, and transmits the map data to the machine-learning prediction module 140, in a step S8.

The fusion and tracking block 115 transmits a first flow of information to the machine-learning prediction module 140, in a step S9; a second flow of information to the pedestrian behavior assessment module 130, in a step S10; and a third flow of information to the prediction fusion module 150, in a step S11.

The first flow of information (step S9) contains, for each tracked pedestrian (whose trajectory is to be predicted), a unique identifier of the pedestrian and pedestrian data representing a history of the trajectory of the pedestrian (in other words: a past trajectory of the pedestrian including for example a list a past positions of a pedestrian track related to one track identifier) for n last seconds (for example n=3). In more details, the first flow of information can include past state vectors of a tracked pedestrian containing data related to the pedestrian such as position, velocity, acceleration and/or orientation, for the n last seconds. The first flow of information can also include past state vectors of surrounding traffic actors with respect to the pedestrian (in other words: from the perspective of the considered pedestrian).

The second flow of information (step S10) contains, for each tracked pedestrian, the unique identifier of the pedestrian, and real time data of the detected pedestrian, here data related to each bounding box detected. In the present example, the bounding box data includes first real time data related to the 2D bounding box detected in the camera domain and second real time data related the 3D bounding box detected in the LIDAR domain. The first real time data can include the coordinates of the 2D bounding box and image data of a cropped image captured by the camera inside the 2D bounding box. The second real time data can include the coordinates of the 3D bounding box and the LIDAR point cloud captured by the LIDAR inside the 3D bounding box.

The third flow of information (step S11) contains a first prediction of information related to the pedestrian based on the tracking data and on one or more dynamic models. The first prediction can include different predictions, here from the Kalman filters, using respectively different dynamic models (for example, and only to illustrate, a "Model 1" and a "Model 2"). In practice, the third flow of information can include state vectors of the pedestrian of each dynamic model with their respective likelihood.

In a step S12, the pedestrian behavior assessment module 130 processes the second flow of information coming from the tracking module 110. In a step S120, the key point detection block 131 detects body key points in the bounding boxes transmitted. The body key points are an important feature to gain knowledge of a pedestrian behavior. In the first embodiment, they are detected based on the data related to the bounding boxes transmitted by the tracking module 110. This allows to have a smaller network architecture and save computation time and resources. Furthermore, the key point detection is only carried out on objects that have been classified as pedestrians with a high probability. As previously indicated, the data from block 112 and/or the components 113 and 114 can be used as an additional source of information. Furthermore, the detection of body key points is optional. Additionally, or alternatively, the sensor data (here, the image data and/or the LIDAR data) might be used by blocks 132 and 133 as well.

In the step S121, the action recognition block 132 determines a class of action performed by the tracked pedestrian (walking, running, etc.). The block 132 classifies the pedestrian behavior into specific actions (e.g., walking, running, crossing, waiting, etc.). In the first embodiment, the classification is performed using physical models and based on the body key points. As previously indicated, the sensor data might be used additionally or alternatively. The action classification can be made by a dedicated neural network.

In a step S122, the traffic awareness detection block 133 detects a state of awareness of the pedestrian with respect to the surrounding traffic situation. The block 133 assesses the pedestrian behavior, especially in terms of estimating a risk that the pedestrian steps onto the road carelessly by detecting the pedestrian's awareness of the current situation around the pedestrian. For example, the block 133 can detect pedestrians that are looking at their phone or something else and distinguish them as less predictable. The awareness state detection can be made by a dedicated neural network. Such a neural network can make a classification based on the pedestrian image information on the pedestrian body and head orientation output from the key point detection in step S120 (and/or from sensor data).

Then, in a step S13, for each tracked pedestrian, the pedestrian behavior assessment module 130 transmits to the machine-learning prediction module 140 data packets each including the following elements: the pedestrian identifier; an action class (e.g., standing, walking, running, lying, etc. . . . ), and a traffic awareness state (e.g., eye contact with the vehicle 200, peripheral sight, unaware, distracted, etc. . . . ).

Optionally, each data packet transmitted by the pedestrian behavior assessment module 130 to the machine-learning prediction module 140 can include information on a pedestrian body and/or head orientation relative to the vehicle 200, and possibly raw body key point information.

In a step S14, the machine-learning prediction module 140 performs a second prediction of information related to the tracked pedestrian at future times, by using the machine-learning algorithm, from input data including: the data of the tracked pedestrian transmitted by the tracking module 110 (step S9); the map data of the operating area transmitted by the map processing module 120 (step S8); additional data of the tracked pedestrian representative of a behavior of the pedestrian, transmitted by the pedestrian behavior assessment module 130 (step S13).

In a step S15, the prediction fusion module 150 performs a fusion of the first prediction of information related to the tracked pedestrian based on information determined by the tracking module 110 and the second prediction of information related to the tracked pedestrian performed by the machine-learning prediction module 140. The first prediction is conventional and based on a tracking and extrapolation approach and using one or more model(s). For example, the first prediction uses Kalman filter(s). As previously indicated, the first prediction can include different predictions from the Kalman filters, using (in other words: based on) different dynamic models respectively (Model 1 and Model 2 in the illustrative example). The second prediction is based on a machine-learning approach. The prediction fusion module 150 performs a fusion of the predictions from the Kalman filters using different dynamic models (for example Model 1 and Model 2), and the machine-learning based model prediction. The fusion allows to improve the accuracy and robustness of the prediction. Depending on the behavior of the pedestrian, the prediction based on the tracking and extrapolation approach may not be sufficient and the prediction based on the machine-learning may be a better prediction. However, in some circumstances, for example when the pedestrian's intention has not changed, the first prediction based on the tracking and extrapolation approach may be relevant and more stable than the second prediction based on the machine-learning approach. The fusion of the first and second predictions can be performed by data fusion, for example in a mathematical framework such as an interacting multiple model estimator.

The predicted information generated by the prediction fusion module 150 can include the following elements of information: a pedestrian identifier; predicted trajectory of the tracked pedestrian at future time frames (e.g., a list of positions at future time frames) and/or an information indicating an intention of the tracked pedestrian at future times (i.e., what the pedestrian intends to do at future times), for example the information that the pedestrian wants to stay on the boardwalk, or wants to cross the road, or waits for the vehicle to pass.

The predicted information generated by the prediction fusion module 150 is transmitted to the output module 160. The module 160 formats the information in accordance with requirements of the autonomous driving system of the vehicle 200, in a step S16.

The method for predicting information related to a pedestrian is a computer-implemented method. The present disclosure also concerns a computer program including instructions which, when the program is executed by a computer, cause the computer to carry out the method for predicting information related to a pedestrian, as described. The program instructions can be stored in a storage module related to the vehicle, such as non-volatile memory and/or a volatile memory. The memory can be permanently or removably integrated in the vehicle or connectable to the vehicle (e.g., via a 'cloud') and the stored program instructions can be executed by a computer, or a calculator, of the vehicle, such as one or more modules of electronic control units (ECUs).

A second embodiment is now described. The second embodiment is based on the first embodiment but differs from it by the fact that the behavior assessment module 130 is an encoder part of an encoder-decoder neural network. It has the function of encoding the input data into a latent code (also called feature, or latent variables, or latent representation). In other words, the module 130 is one component (the encoder) of a whole neural network system. The latent code is part of the input of the prediction module 140 (or prediction network).

In the second embodiment, the behavior assessment module 130 does not classify the pedestrian action and awareness state. However, it has a function of pedestrian behavior assessment and plays the role of an encoder of the whole neural network architecture.

In the second embodiment, the pedestrian behavior assessment module 130 and the machine-learning prediction module 140 can be trained jointly.

What is claimed is:

1. A prediction system having computer hardware components configured to predict information related to a pedestrian, the computer hardware components including:
a tracking module that detects and tracks, from sensor data and in seemingly real-time, a pedestrian in an operating area;
a machine-learning prediction module that uses a machine-learning algorithm to perform a first prediction of information at future times related to the pedestrian from an input including data of the pedestrian generated by the tracking module, and map data of the operating area;
a pedestrian behavior assessment module that determines additional data of the pedestrian that is representative of a real time behavior of the pedestrian, the additional data of the pedestrian being used by the machine-learning prediction module as another input to perform the prediction, the pedestrian behavior assessment module including:
an action recognition block that identifies a class of action of the tracked pedestrian as the additional data; and
a traffic awareness detection block that identifies a class of awareness state of the tracked pedestrian with respect to a traffic situation around the pedestrian as the additional data;
a prediction fusion module that performs a fusion of the prediction of information related to the pedestrian performed by the machine-learning prediction module and a second prediction of information at future times related to the pedestrian based on information determined by the tracking module and generates a third prediction of information of the pedestrian at future times based on the fusion, and the additional data of the pedestrian representative of a real time behavior of the pedestrian.

2. The prediction system according to claim 1, wherein the predicted information related to the tracked pedestrian includes at least one of a pedestrian trajectory at future times and an information on a pedestrian intention at future times.

3. The prediction system according to claim 1, wherein the machine-learning prediction module comprises a deep neural network.

4. The prediction system according to claim 1, wherein the pedestrian behavior assessment module includes a key point detection block that detects body key points of the pedestrian from pedestrian data.

5. The prediction system according to of claim 1, wherein the behavior assessment module is an encoder of an encoder-decoder neural network, and the behavior assessment module and the machine-learning prediction module are trained, jointly.

6. The prediction system according to claim 1, wherein the computer hardware components further include a map processing module that:
receives map data;
receives real time data of a position of a vehicle, the position of the vehicle defining the operating area; and
transmits, to the machine-learning prediction module, a portion of the map data including the operating area.

7. The prediction system according to claim 1, wherein the computer hardware components further include a map processing module that:
receives high-definition map data;
receives real time data of a position of a vehicle, the position of the vehicle defining the operating area;
extracts, from the high definition map data, map data relevant for prediction of information on pedestrians within the operating area, to obtain simplified map data of the operating area; and
transmits, to the machine-learning prediction module, the simplified map data of the operating area.

8. The prediction system according to claim 1, wherein the tracking module includes an object detection block that receives sensor data from different sensor domains and detects objects independently in the different sensor domains.

9. The prediction system according to claim 1, wherein the tracking module includes a fusion and tracking block that performs a fusion of independent object detections from different sensor domains and tracks each fused object detection.

10. The prediction system according to claim 9, wherein the fusion and tracking block tracks a group of objects that are close to each other and share a similar movement.

11. The prediction system according to claim 1, wherein the tracking module uses a projection-based joint probabilistic data association filter.

12. The prediction system according to claim 1, wherein the tracking module transmits a flow of data packets related to the tracked pedestrian to the pedestrian behavior assessment module.

13. The prediction system according to claim 12, wherein each of the data packets comprise:
   identification data of the pedestrian; and
   bounding box data of at least one bounding box corresponding to the pedestrian.

14. A computer-readable media comprising instructions that, when executed, cause computer hardware components of a vehicle to predict information related to a pedestrian near the vehicle by:
   detecting, from sensor data obtained by at least one sensor of the vehicle, a pedestrian located in an operating area of the vehicle;
   tracking, in seemingly real-time, the pedestrian located in the operating area;
   performing, from inputting data of the pedestrian and map data of the operating area to a machine-learning algorithm executing on the vehicle, a first prediction of information at future times, the predicted information related to the tracked pedestrian;
   determining additional data of the pedestrian for input to the machine-learning algorithm as for performing the prediction of the information, the additional data being representative of a real time behavior of the pedestrian and including:
      a class of action of the tracked pedestrian, and
      a class of awareness state of the pedestrian with respect to a traffic situation around the pedestrian;
   performing a fusion of the prediction of information related to the pedestrian and a second prediction of information at future times related to the pedestrian based on information determined by the tracking module, and generating a third prediction of information of the pedestrian at future times based on the fusion, and the additional data of the pedestrian representative of a real time behavior of the pedestrian.

15. The computer-readable media of claim 14, wherein the computer hardware components comprise at least one processor configured to execute a computer program based on the instructions to cause the computer hardware components to predict the information related to the pedestrian.

16. A method, comprising:
   predicting, by computer hardware components of a vehicle, information related to a pedestrian near the vehicle by at least:
   detecting, from sensor data obtained by at least one sensor of the vehicle, a pedestrian located in an operating area of the vehicle;
   tracking, in seemingly real-time, the pedestrian located in the operating area;
   performing, from inputting data of the pedestrian and map data of the operating area to a machine-learning algorithm executing on the vehicle, a first prediction of information at future times, the predicted information related to the tracked pedestrian;
   determining additional data of the pedestrian for input to the machine-learning algorithm as for performing the prediction of the information, the additional data being representative of a real time behavior of the pedestrian and including:
      a class of action of the tracked pedestrian, and
      a class of awareness state of the pedestrian with respect to a traffic situation around the pedestrian;
   performing a fusion of the prediction of information related to the pedestrian and a second prediction of information at future times related to the pedestrian based on information determined by the tracking module, and generating a third prediction of information of the pedestrian at future times based on the fusion, and the additional data of the pedestrian representative of a real time behavior of the pedestrian.

17. The method of claim 16, further comprising:
   outputting, to an autonomous driving system of the vehicle, the prediction of the information to safely control the vehicle in the operating area.

18. The method of claim 16, further comprising:
   outputting a flow of data packets related to the pedestrian to an autonomous driving system of the vehicle to enable safe control of the vehicle when driving in the operating area.

19. The method of claim 18, wherein each of the data packets comprise:
   identification data of the pedestrian; and
   bounding box data of at least one bounding box corresponding to the pedestrian.

* * * * *